United States Patent
Lin et al.

(10) Patent No.: US 8,085,853 B2
(45) Date of Patent: Dec. 27, 2011

(54) VIDEO DECODING AND TRANSCODING METHOD AND SYSTEM

(75) Inventors: Chien-Yu Lin, Sanchong (TW);
Da-Guei Yan, Sindian (TW); Ting-Jian Pan, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1128 days.

(21) Appl. No.: 11/902,547

(22) Filed: Sep. 24, 2007

(65) Prior Publication Data

US 2008/0075162 A1    Mar. 27, 2008

(30) Foreign Application Priority Data

Sep. 25, 2006 (TW) .................. 95135414 A

(51) Int. Cl.
*H04N 7/12* (2006.01)
(52) U.S. Cl. .................................. 375/240.25
(58) Field of Classification Search ......... 375/240, 375/241
See application file for complete search history.

(56) References Cited

U.S. PATENT DOCUMENTS

| | | | | |
|---|---|---|---|---|
| 6,072,548 A * | 6/2000 | Schoner et al. | ...... | 375/240.26 |
| 2005/0123046 A1* | 6/2005 | Wang et al. | ...... | 375/240.15 |
| 2007/0092004 A1* | 4/2007 | Ho | ...... | 375/240.12 |

* cited by examiner

*Primary Examiner* — Ricky Ngo
*Assistant Examiner* — Wei-po Kao
(74) *Attorney, Agent, or Firm* — Bacon & Thomas, PLLC

(57) ABSTRACT

A video decoding and transcoding method and system, which decodes, displays and transcodes a video stream. When a previous frame is completely decoded, a decoding procedure checks whether a frame buffer assigned is usable. When the frame buffer is usable, a current frame is decoded to produce a decoded frame and temporarily store the decoded frame in the frame buffer, and a frame flag corresponding to the frame buffer is set. When a previous field is completely displayed, a displaying procedure checks whether the frame buffer temporarily stores the decoded frame. When the frame buffer temporarily stores the decoded frame, the decoded frame is read and displayed. When the previous frame is completely decoded, a transcoding procedure checks whether the frame buffer temporarily stores the decoded frame. When the frame buffer temporarily stores the decoded frame, the decoded frame is read and transcoded.

13 Claims, 7 Drawing Sheets

```
100 while(decode complete)
110     set current decoding buffer = next decoding buffer
120
130 while(decoding cycle)
140 {
150     if(next decoding buffer == current decoding buffer)
160     {
170             decode and store picture to current decoding buffer
180             //change to next decoding buffer
190             if(next picture of I- or P-picture)
200             {
210                     if(last decoding buffer of IP picture is '0')
220                     {
230                             set next decoding buffer = '1'
240                             set last decoding buffer of IP picture = '1'
250                     }
260                     else
270                     {
280                             set next decoding buffer = '0'
290                             set last decoding buffer of IP picture = '0'
300                     }
310             }
320             else if(next picture of B-picture)
330             {
340                     if(last decoding buffer of B picture is '2')
350                     {
360                             set next decoding buffer = '3'
370                             set last decoding buffer of B picture = '3'
380                     }
390                     else
400                     {
410                             set next decoding buffer = '2'
420                             set last decoding buffer of B picture = '2'
430                     }
440             }
450     }
460     else // decode incomplete
470     {
480             wait for decoding
490     }
500 }
510
520 while(displaying cycle)
530 {
540     if(display next buffer == decode current decoding buffer)
550     {//decode incomplete
560             remain current displaying buffer
570     }
580     else
590     {
600             change to display next buffer
610     }
620 }
```

FIG. 10

VIDEO DECODING AND TRANSCODING METHOD AND SYSTEM

BACKGROUND OF THE INVENTION

1. Field of the Invention

The present invention relates to the technical field of image processing and, more particularly, to a video decoding and transcoding method and system.

2. Description of Related Art

Typically, when transmitting an audio-video stream, it requires performing a video transcoding on the audio-video stream in order to convert and reduce the frame rate or resolution of the audio-video stream for transmitting in a congested network. The video transcoding typically reduces the frame rate of a compressed motion image data to become another compressed motion image data. Accordingly, the alternate rate of frames is reduced to further reduce the bit rate of the compressed motion image data for overcoming the insufficient bandwidth in video transmission.

FIG. 1 is a block diagram of a conventional video decoding and transcoding system. As shown in FIG. 1, for eliminating a complex control circuit, a video stream decoded by a decoding unit 110 is stored in a first memory 120 and a second memory 130 respectively. A displaying unit 140 reads the decoded frames of the video stream stored in the first memory 120 for display. A transcoding unit 150 reads the decoded frames of the video stream stored in the second memory 130 for transcode. Accordingly, three frame buffers are required respectively by the first memory 120 and the second memory 130 for display and transcode. Such an implementation can eliminate the complex control circuit. However, it requires a great of memory bandwidth and space.

FIG. 2 is a block diagram of another conventional video decoding and transcoding system. As shown in FIG. 2, for saving the required memory, the system uses a memory 220 with three frame buffers. A displaying unit 230 also sends the displayed frames to a transcoding unit 240. Accordingly, using the memory 220 with three frame buffers and a bandwidth with one memory access capability is enough for the operations.

However, such a system is limited in use due to the requirement of same display and transcode specifications. When the display and the transcode specifications are different, the transcoding operations present certain problems. For example, if a displaying speed of 25 frames/sec and a transcoding speed of 30 frames/sec are used, the collision is presented in memory use since the memory 220 contains three frame buffers only. In addition, if the brightness of a displaying frame is increased on displaying, the brightness of a corresponding transcoding frame is different from that of the displaying frame.

Therefore, it is desirable to provide an improved method to mitigate and/or obviate the aforementioned problems.

SUMMARY OF THE INVENTION

An object of the present invention is to provide a video decoding and transcoding method and system, which can reduce the required memory and save the cost.

An object of the present invention is to provide a video decoding and transcoding method and system, which can overcome the memory collision in use.

In accordance with one aspect of the present invention, there is provided a video decoding and transcoding method, which decodes, displays and transcodes a video stream with a sequence of frames and temporarily stores decoded frames in a plurality of frame buffers, each of the decoded frames having a first field and a second field. The method includes: a decoding procedure, which checks whether a frame buffer is usable when a previous frame is completely decoded and subsequently decodes a current frame, temporarily stores a decoded frame corresponding to the current frame in the frame buffer and sets a frame flag corresponding to the frame buffer when the frame buffer is usable; a displaying procedure, which checks whether the frame buffer temporarily stores the decoded frame when a previous field is completely displayed and subsequently reads and displays the decoded frame when the frame buffer temporarily stores the decoded frame; and a transcoding procedure, which checks whether the frame buffer temporarily stores the decoded frame when the previous frame is completely decoded and subsequently reads and transcodes the decoded frame when the frame buffer temporarily stores the decoded frame.

In accordance with another aspect of the present invention, there is provided a video decoding and transcoding system, which decodes, displays and transcodes a video stream with a sequence of frames and produce decoded frames, each decode frame having a first field and a second field. The system includes a memory, a decoding unit, a displaying unit and a transcoding unit. The memory has a plurality of frame buffers to temporarily store the frames of the video stream on decoding and transcoding. The decoding unit is connected to the memory in order to receive and decode the video stream to accordingly produce decoded frames and write the decoded frames respectively to assigned frame buffers of the memory, wherein the decoding unit checks whether a frame buffer is usable when a previous frame is completely decoded and subsequently decodes a current frame to accordingly produce a decoded frame, temporarily stores the decoded frame in the frame buffer and sets a frame flag corresponding to the frame buffer when the frame buffer is usable. The displaying unit is connected to the memory in order to read and display the decoded frames temporarily stored in the assigned frame buffers of the memory, wherein the displaying unit checks whether the frame buffer temporarily stores the decoded frame when a previous field is completely displayed and subsequently reads and displays the decoded frame when the frame buffer temporarily stores the decoded frame. The transcoding unit is connected to the memory in order to read data from an assigned frame buffer and send the data read to an encoding unit for performing an encoding operation and producing a corresponding bitstream, wherein the transcoding unit checks whether the frame buffer temporarily stores the decoded frame when the previous frame is completely decoded and subsequently reads and transcodes the decoded frame when the frame buffer temporarily stores the decoded frame.

In accordance with further aspect of the present invention, there is provided a video decoding and transcoding system is provided, which decodes, displays and transcodes a video stream with a sequence of frames and produces decoded frames having a first field and a second field each. The system includes a memory, a decoding unit, a displaying unit, a transcoding unit and a controller. The memory has a plurality of frame buffers to temporarily store the frames of the video stream on decoding and transcoding. The decoding unit is connected to the memory in order to receive and decode the video stream to accordingly produce a decoded frame and write the decoded frame to an assigned frame buffer of the memory. The displaying unit is connected to the memory in order to read and display the decoded frame temporarily stored in the assigned frame buffer of the memory. The transcoding unit is connected to the memory in order to read data from a predetermined frame buffer and send the data read to an encoding unit for performing an encoding operation and producing a corresponding bitstream. The controller is connected to the decoding unit, the displaying unit and the transcoding unit in order to initialize and control an operation timing of the units and access the frame buffers, wherein the controller numbers the frame buffers to thereby control the operation timing of the units.

Other objects, advantages, and novel features of the invention will become more apparent from the following detailed description when taken in conjunction with the accompanying drawings.

BRIEF DESCRIPTION OF THE DRAWINGS

FIG. 10 is a schematic graph of pseudo codes of a controller in accordance with another embodiment of the invention.

DETAILED DESCRIPTION OF THE PREFERRED EMBODIMENT

Figure 1:
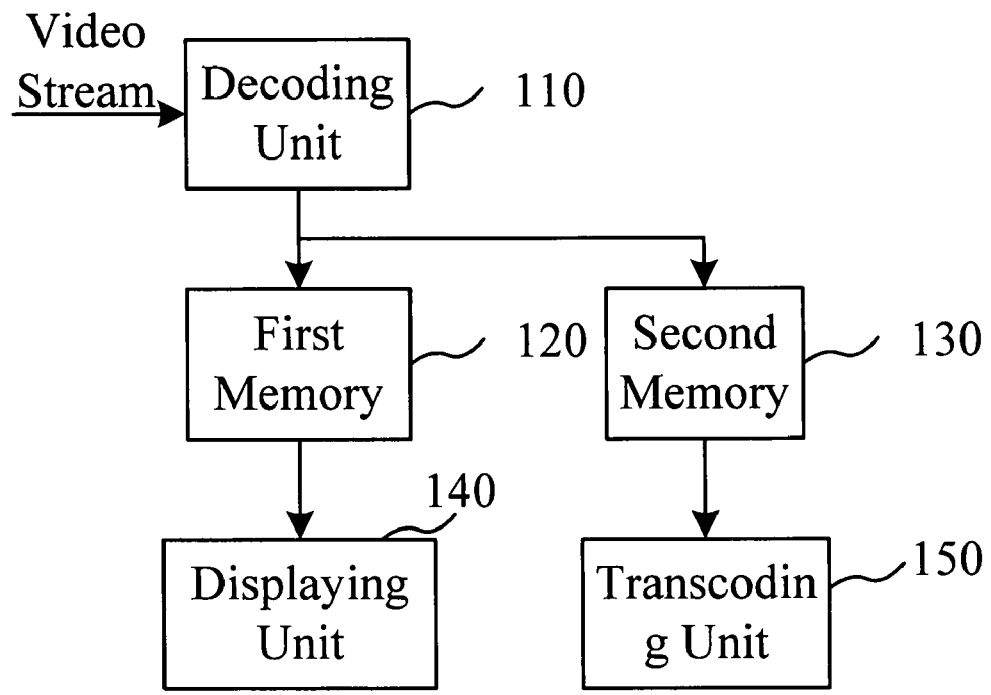
FIG. 1 is a block diagram of a conventional video decoding and transcoding system.
Figure 2:
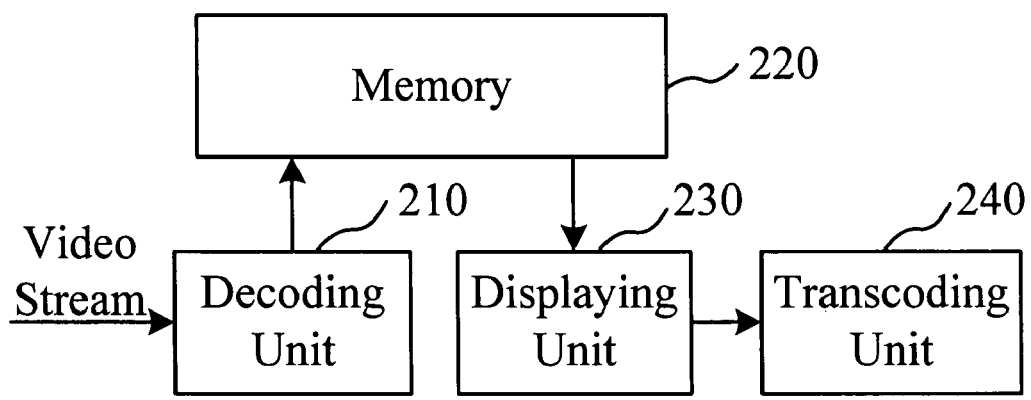
FIG. 2 is a block diagram of another conventional video decoding and transcoding system.
Figure 3:
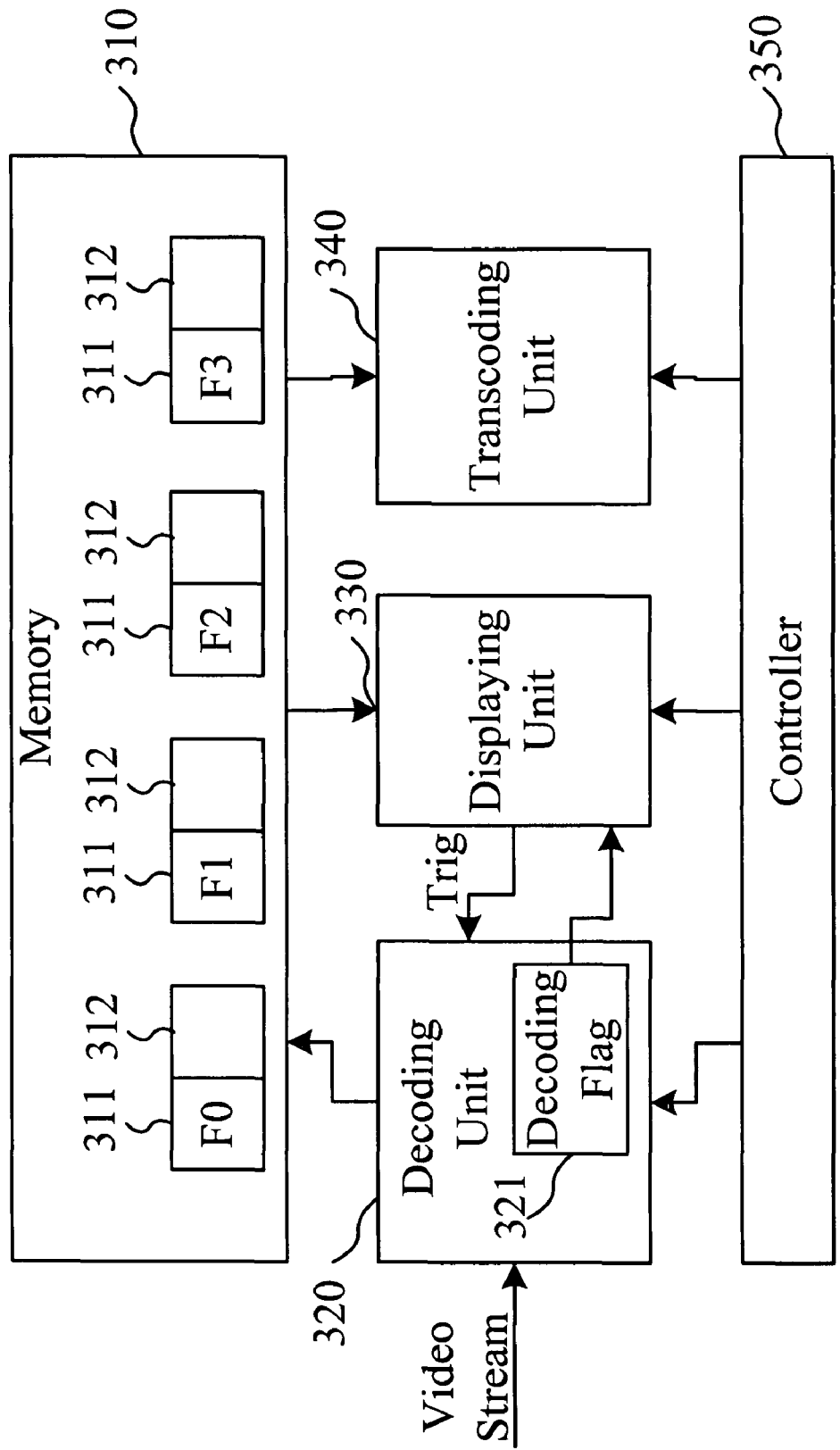
FIG. 3 is a block diagram of a video decoding and transcoding system in accordance with an embodiment of the invention.

FIG. 3 is a block diagram of a video decoding and transcoding system in accordance with an embodiment of the invention. The system decodes, displays and transcodes a video stream. The video stream has a sequence of frames, and each frame has a first field and a second field. The first field is referred to as a top field, and the second field is referred to as a bottom field.

The system includes a memory 310, a decoding unit 320, a displaying unit 330, a transcoding unit 340 and a controller 350. The memory 310 has a plurality of frame buffers 311 to temporarily store the frames on decoding and transcoding. In this embodiment, the memory preferably has four frame buffers 311.

The memory 310 can be a synchronous dynamic random access memory (SDRAM) or double data rate dynamic random access memory (DDR DRAM). The DDR DRAM can be a DDR-I, DDR-II, DDR-333 or DDR-400.

The decoding unit 320 is connected to the memory 310 in order to receive and decode the video stream and write the decoded frames respectively to the assigned frame buffers 311 of the memory 310. When a previous frame is completely decoded, the decoding unit 320 checks whether a frame buffer 311 is usable. When the frame buffer is usable, the decoding unit 320 decodes a current frame to accordingly produce a decoded frame, temporarily stores the decoded frame in the frame buffer 311 and sets a frame flag 312 corresponding to the frame buffer 311 for indicating the frame buffer 311 usable.

The decoding unit 320 further includes a decoding flag 321 when the frame buffer 311 is not usable, and in this case no decoding operation is performed on the current frame. The decoding flag 321 is set to indicate the current frame to wait for decoding.

The displaying unit 330 is connected to the memory 310 in order to read and display the decoded frames of the video stream temporarily stored in the assigned frame buffers 311 of the memory 310. When a previous field is completely displayed, the displaying unit 330 checks whether a frame buffer 311 temporarily stores a decoded frame. When the frame buffer 311 temporarily stores the decoded frame, the displaying unit 330 reads and displays the decoded frame temporarily stored in the frame buffer 311.

The displaying unit 330 checks the frame flag 312 corresponding to the frame buffer 311 for reading and displaying the decoded frame. When the displaying unit 330 finds that the frame buffer 311 does not store the decoded frame, the previous field is displayed again.

When the previous field is completely displayed, the displaying unit 330 further checks the decoding flag 321. When the decoding flag 321 is set, it indicates a current frame to wait for decoding. Accordingly, the displaying unit 330 produces a signal Trig to trigger the decoding unit 320.

The transcoding unit 340 is connected to the memory 310 in order to read data from a predetermined frame buffer 311 and send the data read to an encoding unit (not shown) for performing an encoding operation and producing a corresponding bitstream. When the previous frame is completely decoded, the transcoding unit 340 checks whether a frame buffer 311 temporarily stores a decoded frame and subsequently reads and transcodes the decoded frame when the frame buffer 311 temporarily stores the decoded frame. Conversely, when the frame buffer does not store the decoded frame, the transcoding unit 340 does not perform any transcoding operation.

The controller 350 is connected to the decoding unit 320, the displaying unit 330 and the transcoding unit 340 in order to initialize and control the operation timing of the units 320, 330 and 340.

Figure 4:
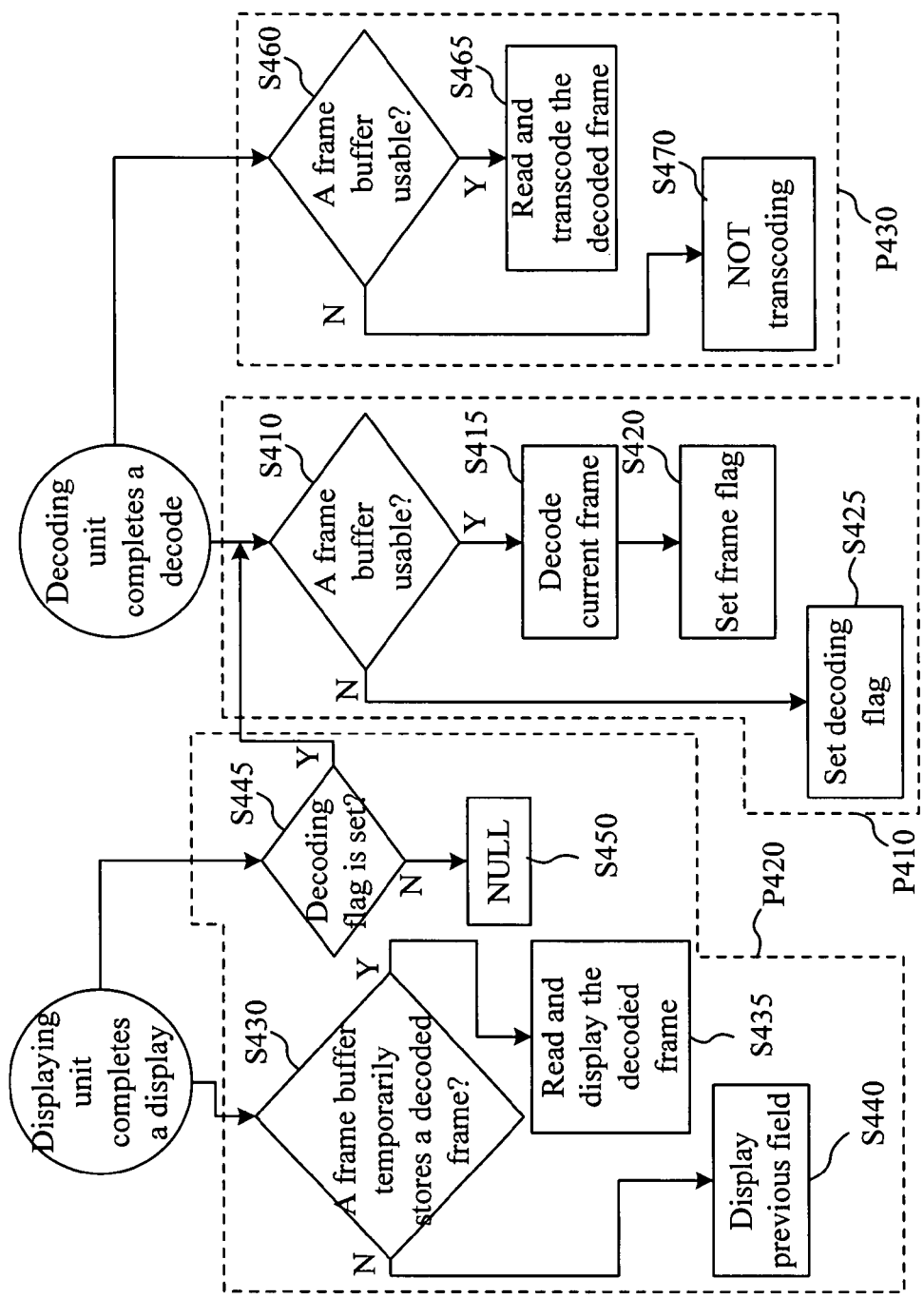
FIG. 4 is a flowchart of a video decoding and transcoding method in accordance with an embodiment of the invention.

FIG. 4 is a flowchart of a video decoding and transcoding method in accordance with an embodiment of the invention. The method decodes, displays and transcodes a video stream and temporarily stores decoded frames in a plurality of frame buffers. The video stream has a sequence of frames. Each of the decoded frames has a first field and a second field. The first field is referred to as a top field, and the second field is referred to as a bottom field.

The method includes a decoding procedure P410, a displaying procedure P420 and a transcoding procedure P430. When the decoding unit 320 completely decodes a previous frame, the decoding procedure P410 and the transcoding procedure P430 are triggered. The displaying unit 330 completely displays a field, the displaying procedure P420 is triggered. The trigger events for completely displaying the previous field and completely decoding the previous frame can be asynchronous or synchronous. In addition, the trigger events start at the beginning. The decoding procedure P410 is executed when a frame buffer is usable, and subsequently the displaying procedure P420 is executed when the frame buffer contains the decoded data.

In step S410, when a previous frame is completely decoded, it is checked whether a frame buffer 311 is usable. When the frame buffer 311 is usable, a current frame is decoded and temporarily stored in the frame buffer 311 (step S415), and a frame flag 312 corresponding to the frame buffer 311 is set to be usable (step S420).

In step S410, when the frame buffer 311 is not usable, the current frame is not decoded, and a decoding flag 321 is set to indicate the current frame to wait for decoding (S425).

In step S430, when a previous field is completely displayed, it is checked whether a frame buffer 311 temporarily stores a decoded frame. When the frame buffer 311 temporarily stores the decoded frame, the decoded frame temporarily stored in the frame buffer 311 is read and displayed (step S435). Step S430 checks the frame flag 312 corresponding to the frame buffer 311 to determine whether the frame buffer 311 temporarily stores the decoded frame.

In step S430, when the frame buffer 311 does not store the decoded frame, the previous field is displayed again (step S440).

The displaying procedure P420 further checks the decoding flag 321 when the previous field is completely displayed. When the decoding flag 321 is set, the displaying procedure P420 triggers the decoding procedure P410 (step S445). When the decoding flag 321 is not set, no operation is performed (step S450).

In step S460, when the previous frame is completely decoded, it is checked whether the frame buffer 311 temporarily stores the decoded frame. When the frame buffer 311 temporarily stores the decoded frame, the decoded frame temporarily stored in the frame buffer 311 is read and transcoded (step S465). When the frame buffer 311 does not store the decoded frame, the transcoding operation is not performed (step S470). In step S460, the frame flag 312 corresponding to the frame buffer 311 is checked. Namely, when the procedure P410 decodes a frame and sets the frame flag 312 corresponding to the frame buffer 311 completely, step S465 is executed.

Figure 5:
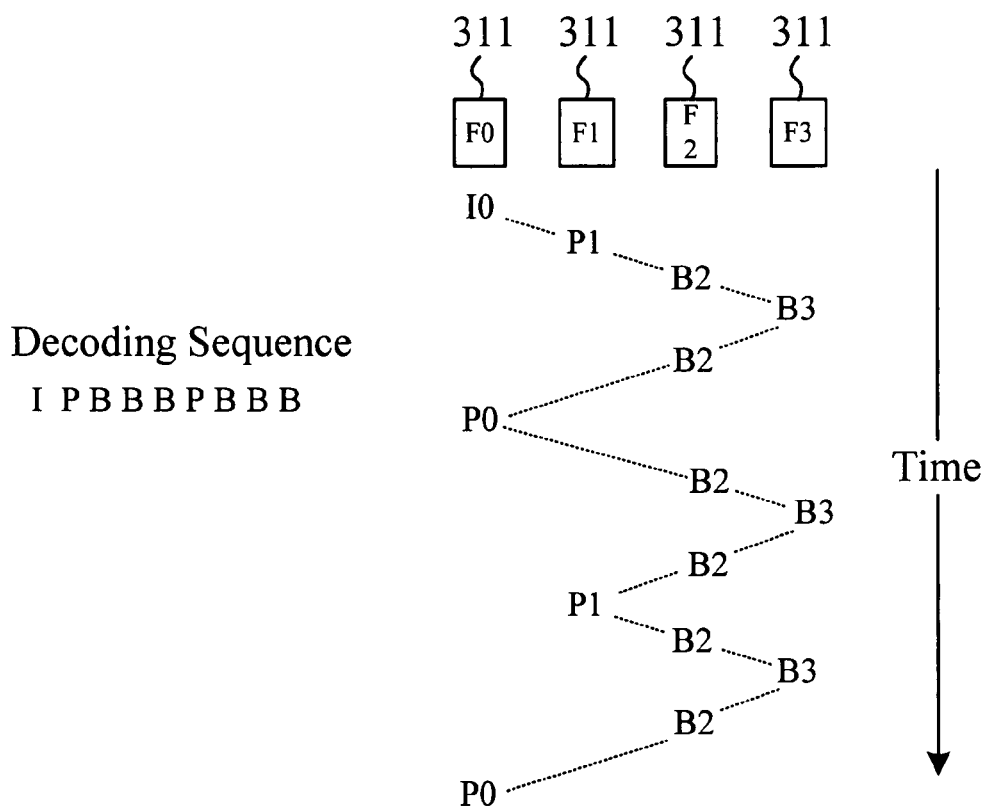
FIG. 5 is a schematic diagram of an operation in accordance with an embodiment of the invention.

FIG. 5 is a schematic diagram of an operation in accordance with an embodiment of the invention. The decoding sequence IPBBBPBBB . . . is shown, where I indicates I-picture, B indicates B-picture and P indicates P-picture. In addition, the numbers indicate the positions of the frame buffers which store the pictures. For example, P1 indicates that a decoded P-picture is temporarily stored in the frame buffer F1. As shown in FIG. 5, the frame buffers F0 and F1 are used to temporarily store I- and P-picture, and the frame buffers F2 and F3 are used to temporarily store B-picture.

Figure 6:
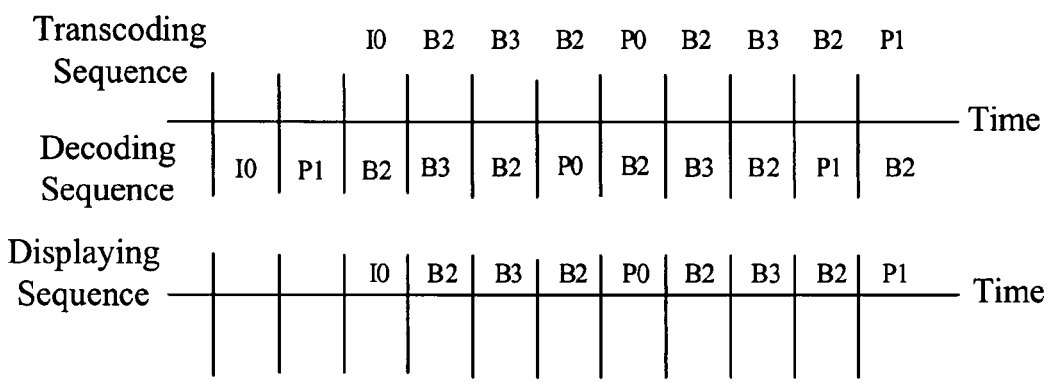
FIG. 6 is a timing diagram of FIG. 5 in accordance with an embodiment of the invention.

FIG. 6 is a timing of FIG. 5 in accordance with an embodiment of the invention. In this case, the trigger events for completely decoding the previous field and the previous frame are synchronous. For example, the decoding speed is 30 frames/sec, which is identical to the displaying speed and the transcoding speed.

Figure 7:
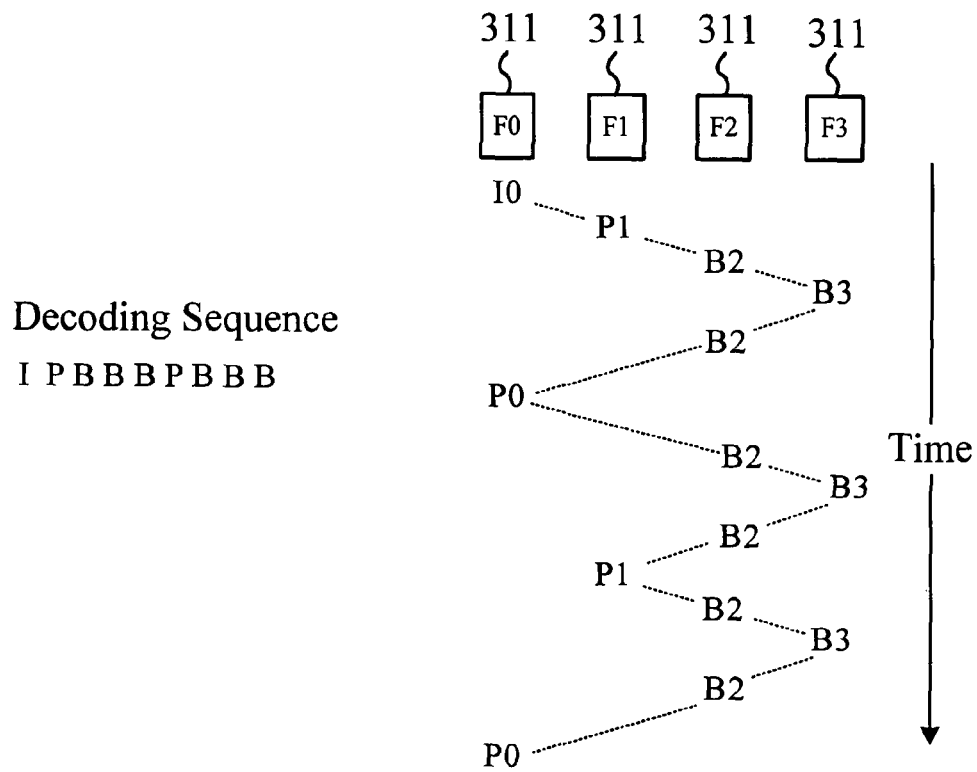
FIG. 7 is a schematic diagram of another operation in accordance with an embodiment of the invention.

FIG. 7 is a schematic diagram of another operation in accordance with an embodiment of the invention. The decoding sequence IPBBBPBBB . . . is shown. As shown in FIG. 7, the frame buffers F0 and F1 are used to temporarily store I- and P-picture, and the frame buffers F2 and F3 are used to temporarily store B-picture.

Figure 8:
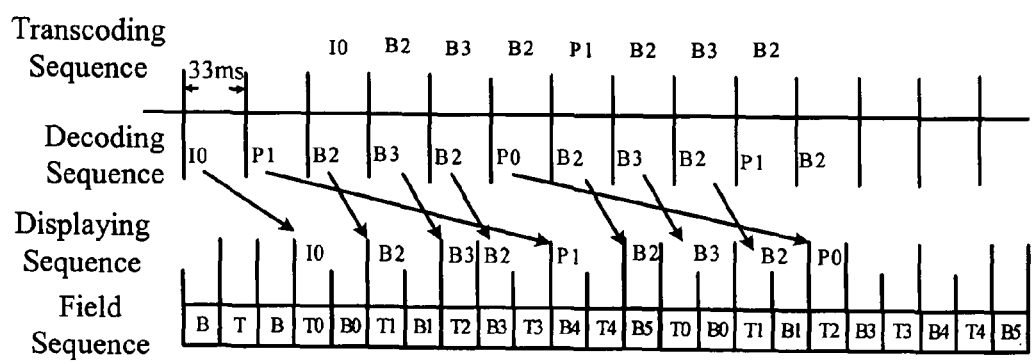
FIG. 8 is a timing diagram of FIG. 7 in accordance with an embodiment of the invention.

FIG. 8 is a timing of FIG. 7 in accordance with an embodiment of the invention. In this case, the trigger events for completely decoding the previous field and the previous frame are asynchronous. For example, the decoding speed and the transcoding speed are 30 frames/sec, and the displaying speed is 25 frames/sec. For adjusting the decoding speed of 30 frames/sec and the displaying speed of 25 frames/sec, only the top field T2 of the frame B2 is displayed. Namely, the asynchronous problem is overcome by displaying only five fields every three decoded frames.

Figure 9:
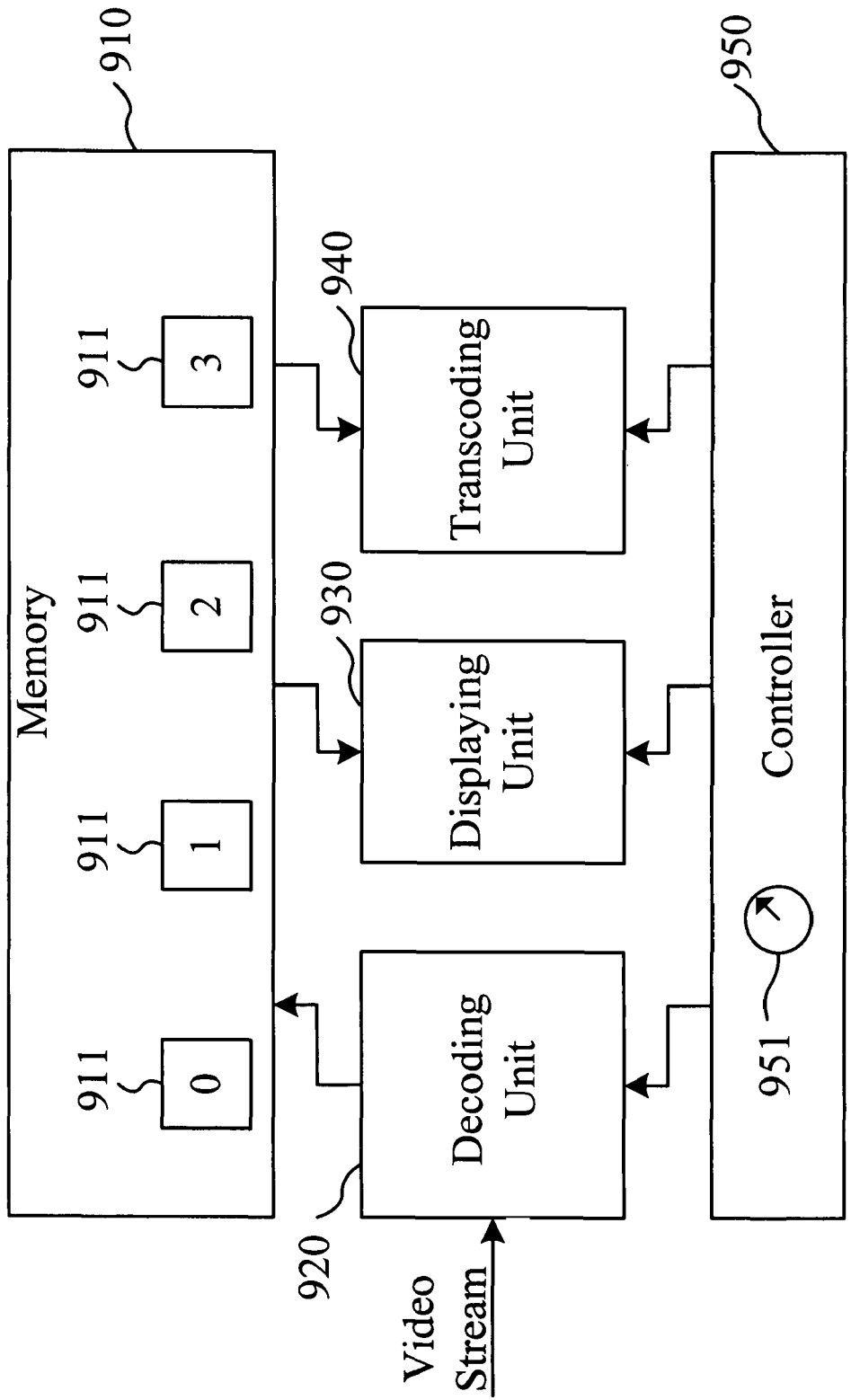
FIG. 9 is a block diagram of a video decoding and transcoding system in accordance with another embodiment of the invention.

FIG. 9 is a block diagram of a video decoding and transcoding system in accordance with another embodiment of the invention. The difference between FIGS. 3 and 9 essentially is in that the controller 950 in FIG. 9 is used to control the access sequence of the four frame buffers 911. Namely, the controller 950 sets the access to the frame buffers 911 for the decoding unit 920, the displaying unit 930 and the transcoding unit 940. The controller 950 uses a timing generator 951 to produce the associated trigger events. As shown in FIG. 9, the frame buffers 0 and 1 temporarily store I- and P-picture, and the frame buffers 2 and 3 temporarily store B-picture. FIG. 10 is a schematic graph of pseudo codes of a controller in accordance with another embodiment of the invention. To convenient description, the pseudo codes are numbered in rows.

Rows 100-110 set the next decoding buffer 911 to become the current decoding buffer 911 when the current decoding is complete.

Row 130 presents a trigger event that the timing generator 951 produces a decoding cycle. Row 130 checks whether the next decoding buffer 911 becomes the current decoding buffer 911. When the next decoding buffer 911 does not become the current decoding buffer 911, it indicates that the current decoding is not complete, and the controller 350 executes the pseudo codes at rows 460-490 to wait for the decoding completeness. When the next decoding buffer 911 becomes the current decoding buffer 911, it indicates that the decoding is complete, and the controller 350 executes the pseudo codes at rows 170-450.

Row 170 executes a video decoding and stores it in the current decoding buffer. Row 190 determines whether a next decoding frame is of I- or P-picture. When the next decoding frame is of I- or P-picture, the controller 350 executes the pseudo codes at rows 200-310. When the next decoding frame is not of I- or P-picture, the controller 350 executes the pseudo codes at rows 320-440.

Row 210 determines whether the frame buffer 911 numbered "0" is applied to the last decoded I- or P-picture. When the frame buffer 911 numbered "0" is applied to the last decoded I- or P-picture, the controller 350 assigns the frame buffer 911 used for a next decoded I- or P-picture to number "1" and the frame buffer 911 used for the last decoded I- or P-picture to number "1". When the frame buffer 911 numbered "0" is not applied to the last decoded I- or P-picture, the controller 350 assigns the frame buffer 911 used for the next decoded I- or P-picture to number "0" and the frame buffer 911 used for the last decoded I- or P-picture to number "0".

Row 320 determines whether the next decoding frame is of B-picture. When the next decoding frame is of B-picture, the controller 350 executes the pseudo codes at rows 340-430.

Row 340 determines whether the frame buffer 911 numbered "2" is applied to the last decoded B-picture. When the frame buffer 911 numbered "2" is applied to the last decoded B-picture, the controller 350 assigns the frame buffer 911 used for a next decoded B-picture to number "3" and the frame buffer 911 used for the last decoded B-picture to number "3". When the frame buffer 911 numbered "2" is not applied to the last decoded B-picture, the controller 350 assigns the frame buffer 911 used for the next decoded B-picture to number "2" and the frame buffer 911 used for the last decoded B-picture to number "2".

Row 520 presents a trigger event that the timing generator 951 produces a displaying cycle. Row 540 checks whether the next buffer 911 to be displayed and the current decoding buffer 911 have a same number. When a next displaying buffer 911 and the current decoding buffer 911 have a same number, it indicates that the current decoding is not complete, and the content of the last displaying buffer 911 is repeatedly displayed (row 560). When a next displaying buffer 911 and the current decoding buffer 911 have different numbers, the content of the next displaying buffer 911 is displayed (row 600).

In view of foregoing, it is known that the invention uses the data sharing feature of the frame buffers to control the decoding time of pictures and the replacement of frame buffers for all sequences of coded pictures. Accordingly, the memory space and bandwidth is saved, and the collision in memory use is overcome.

Although the present invention has been explained in relation to its preferred embodiment, it is to be understood that many other possible modifications and variations can be made without departing from the spirit and scope of the invention as hereinafter claimed.

What is claimed is:

1. A video decoding and transcoding method, which decodes, displays and transcodes a video stream with a sequence of frames and temporarily stores decoded frames in a plurality of frame buffers, each of the decoded frames having a first field and a second field, the method comprising the steps:
    a decoding procedure, which checks whether a frame buffer is usable when a previous frame is completely decoded and subsequently decodes a current frame, temporarily stores a decoded frame corresponding to the current frame in the frame buffer and sets a frame flag corresponding to the frame buffer when the frame buffer is usable, wherein the decoding procedure does not decode the current frame when the frame buffer is not usable and sets a decoding flag to indicate that the current frame is waiting for decoding;
    a displaying procedure, which checks whether the frame buffer temporarily stores the decoded current frame when a previous field is completely displayed and subsequently reads and displays the decoded current frame when the frame buffer temporarily stores the decoded current frame, wherein the displaying procedure checks the decoding flag when the previous field is completely displayed and triggers the decoding procedure when the decoding flag is set; and
    a transcoding procedure, which checks whether the frame buffer temporarily stores the decoded current frame when the previous frame is completely decoded and subsequently reads and transcodes the decoded current frame when the frame buffer temporarily stores the decoded current frame.

2. The method as claimed in claim 1, wherein the displaying procedure repeatedly displays the previous field when the frame buffer does not store the decoded current frame.

3. The method as claimed in claim 1, wherein the displaying procedure checks that the frame flag corresponding to the frame buffer is set to thereby determine that the frame buffer temporarily stores the decoded current frame.

4. The method as claimed in claim 1, wherein the transcoding procedure is not executed when the frame buffer does not store the decoded current frame.

5. The method as claimed in claim 1, wherein the previous frame and the previous field are completely decoded in asynchronous.

6. The method as claimed in claim 1, wherein the previous frame and the previous field are completely decoded in synchronous.

7. A video decoding and transcoding system, which decodes, displays and transcodes a video stream with a sequence of frames and produces decoded frames having a first field and a second field each, the system comprising:
    a memory, which has a plurality of frame buffers to temporarily store the frames of the video stream on decoding and transcoding;
    a decoding unit, which is connected to the memory, in order to receive and decode the video stream to accordingly produce the decoded frames and write the decoded frames respectively to the frame buffers assigned of the memory, wherein the decoding unit checks whether a frame buffer is usable when a previous frame is completely decoded and subsequently decodes a current frame to accordingly produce the decoded current frame, temporarily stores the decoded current frame in the frame buffer and sets a frame flag corresponding to the frame buffer when the frame buffer is usable, wherein the decoding unit comprises a decoding flag, which is set to indicate the current frame is waiting for decoding when the frame buffer is not usable and the current frame is not decoded;
    a displaying unit, which is connected to the memory, in order to read and display the decoded frames temporarily stored in the frame buffers assigned of the memory, wherein the displaying unit checks whether the frame buffer temporarily stores the decoded current frame when a previous field is completely displayed and subsequently reads and displays the decoded current frame when the frame buffer temporarily stores the decoded current frame, wherein the displaying unit checks the decoding flag when the previous field is completely displayed and triggers the decoding unit when the decoding flag is set;
    a transcoding unit, which is connected to the memory in order to read data from the assigned frame buffer and send the data to an encoding unit for performing an encoding operation and producing a corresponding bitstream, wherein the transcoding unit checks whether the frame buffer temporarily stores the decoded current frame when the previous frame is completely decoded and subsequently reads and transcodes the decoded current frame when the frame buffer temporarily stores the decoded current frame; and
    a controller, which is connected to the decoding unit, the displaying unit and the transcoding unit, in order to initialize and control an operation timing of the decoding, displaying and transcoding units.

8. The system as claimed in claim 7, wherein the displaying unit repeatedly displays the previous field when the frame buffer does not store the decoded current frame.

9. The system as claimed in claim 7, wherein the displaying unit checks that the frame flag corresponding to the frame buffer is set to thereby determine that the frame buffer temporarily stores the decoded current frame.

10. The system as claimed in claim 7, wherein the transcoding unit does not perform a transcoding operation when the frame buffer does not store the decoded current frame.

11. The system as claimed in claim 7, wherein the memory has four frame buffers.

12. The system as claimed in claim 7, wherein the previous frame and the previous field are completely decoded in asynchronous.

13. The system as claimed in claim 7, wherein the previous frame and the previous field are completely decoded in synchronous.

* * * * *